United States Patent [19]

Schapp et al.

[11] Patent Number: 4,947,590
[45] Date of Patent: Aug. 14, 1990

[54] METHOD FOR THE PRECISION WORKING OF CROWNED TOOTH FLANKS ON PARTICULARLY HARDENED GEARS

[75] Inventors: Udo Schapp, Wessling; Josef Lohrer, Munich, both of Fed. Rep. of Germany

[73] Assignee: Carl Hurth Maschinen- und Zahnradfabrik GmbH & Co., Munich, Fed. Rep. of Germany

[21] Appl. No.: 256,685

[22] Filed: Oct. 12, 1988

[30] Foreign Application Priority Data

Oct. 13, 1987 [DE] Fed. Rep. of Germany ....... 3734652
Jul. 12, 1988 [DE] Fed. Rep. of Germany ....... 3823560

[51] Int. Cl.[5] .............................................. B23F 19/06
[52] U.S. Cl. ..................................... 51/287; 51/52 R; 409/32; 409/33
[58] Field of Search ................... 51/287, 52 R, 26, 32; 409/32, 33

[56] References Cited

U.S. PATENT DOCUMENTS

| 2,346,266 | 4/1944 | Mentley | 409/32 |
| 2,669,905 | 2/1954 | Miller | 409/33 |
| 3,188,915 | 6/1965 | Hurth | 409/33 |
| 4,477,214 | 10/1984 | Spensberger | 51/52 R |
| 4,545,708 | 10/1985 | Buschhoff et al. | 51/52 R |
| 4,575,289 | 3/1986 | Fischer et al. | 409/33 |

Primary Examiner—Robert A. Rose
Attorney, Agent, or Firm—Flynn, Thiel, Boutell & Tanis

[57] ABSTRACT

A method for the precision working of crowned tooth flanks of particularly hardened gears with a two-flank abutment and at crossed axes with an abrasive gear-shaped or rack-shaped tool, in which the tool carries out several back and forth feed movements relative to the workpiece in a direction X extending at an angle $\epsilon$ inclined with respect to the workpiece axis 4 and a plunge feed movement in the sense of a center-distance reduction. The tool does not have corrected teeth. The crowning is created only at the end of the precision working during at least one back and forth feed movement without a plunge feed movement.

11 Claims, 5 Drawing Sheets

METHOD FOR THE PRECISION WORKING OF CROWNED TOOTH FLANKS ON PARTICULARLY HARDENED GEARS

FIELD OF THE INVENTION

The invention relates to a method of use of a tool for the precision working of crowned tooth flanks on hardened workpiece gears.

BACKGROUND OF THE INVENTION

The invention is based on a state of the art, as it is known from DE No. 31 23 502 C2, which corresponds to U.S. Pat. No. 4,477,214. The machine described in this patent is intended in the first place for the precision working of the tooth flanks of not (yet) hardened gears, thus for a shaving of the gear with a shaving gear, namely, according to the parallel, diagonal and underpass methods. However, the machine can also be utilized in a limited manner for the precision working of the tooth flanks of hardened gears, thus for the honing, fine finishing, finish grinding, etc. (a uniform definition of these methods does not exist up to now) with an abrasive tool. In particular during the diagonal and underpass methods, the tool is worn rather quickly, so that the methods, in spite of the shorter machining time compared with the parallel method, are so far not widely used.

If the gears to be machined are to receive crowned flanks, then it is possible with the parallel and diagonal method to create evenly crowned flanks only over their entire width, since the tool, in dependency of the longitudinal or diagonal feed, to which is to be added a radial infeed or plunge feed, carries out a swivel movement.

Also a method for the precision working of hardened gears is known ("Werkstatt und Betrieb", 118th year (1985), No. 8, Pages 505 to 509, here: Page 506), in which the abrasive tool is moved parallel to the workpiece axis and a radial infeed or plunge feed occurs intermittently thereto, with a swivel movement of the workpiece being superposed over the longitudinal feed for manufacturing crowned tooth flanks. The longitudinal feed, however, demands—just like in the case of the method mentioned in the beginning—long machining times and should therefore be avoided.

The tool is in another known method supplied exclusively radially, thereby permitting a shorter machining time. In order to machine the workpiece tooth system over its entire width, the tool tooth system must abut the workpiece tooth system, which creates certain problems during the tool manufacture. These problems are magnified when crowned tooth flanks are to be created, since the crowning of the workpiece must be worked additionally in a complementary form into the tool.

Tooth flanks, which are crowned only at their end areas, that is, in the areas adjacent to the axially facing tooth faces, can only be created in the underpass method with tools which are extremely difficult to manufacture.

Starting out from the disclosed disadvantages of the known methods, the basic purpose of the invention is to further develop the initially mentioned method so that crowned tooth flanks can be created on hardened gears in an acceptable amount of time with the least possible tool wear.

This purpose is attained with a method wherein the tool during at least one feed movement without plunge feed carries out a tilting movement about an axis which is at least approximately tangent to the rolling cylinder of the tool and is directed both perpendicularly with respect to the common normal and also perpendicularly with respect to the workpiece axis. It has proven to be sensible for the machine adjustment or rather programming to first, very normally, precision work the workpiece teeth and to remove only at the end of the machining task the requisite amount of material for crowning the teeth at the tooth ends.

A significant improvement is achieved with the method wherein:

(a) The feed movements, which occur in connection with the plunge feed, are dimensioned such that the path covered by the crossed-axes point on the workpiece in axial direction, ends before the crossed-axes point has reached the edges of the tooth flanks at the axially facing sides of the tooth, (b) the feed movements, which occur without plunge feed, are dimensioned such that the path covered by the crossed-axes point on the workpiece in axial direction, ends the earliest when the crossed-axes point has reached the tooth flanks, and (c) the tool carries out only during at least one feed movement without plunge feed a tilting movement about an axis which at least approximately is tangent to the rolling cylinder of the tool and is directed both perpendicularly with respect to the common normal and also perpendicularly with respect to the workpiece axis, which can be supplemented by all feed movements occurring with the plunge feed being equally long.

It has been discovered that the mentioned increased tool wear is caused by the hardness at the ends of the workpiece teeth. Thus, material removal is to occur so to speak "from the inside", namely the machining occurs first primarily in the slightly less hard area of the tooth flanks without crowning being considered, and only toward the end of the precision working is the material removed at the very hard tooth ends and the desired crowning created at the same time. The machine according to the aforesaid DE No. 31 23 502 C2 and U.S. Pat. No. 4,477,214 is not suited to carry out the inventive method. A suitable machine will be described later on.

The first machined slightly less hard area can, as long as an infeed movement (plunge feed) still occurs, remain the same, however, it can also little by little be increased. However, the crossed-axes point should never wander beyond the edges of the tooth flanks at the axially facing sides of the workpiece.

Because of the danger of a secondary burr formation at the pointed tooth ends in helical tooth systems, one lets the feed movements advantageously start off-center, namely, at a point adjacent to the blunt tooth ends, which can simultaneously be a reversal point of the feed movements. The speed of the tool-workpiece pair should also be increased at this point at the start of the precision working.

The inventive method can be further developed wherein the plunge feed occurs initially at a first feed speed or step size and, after reaching a selectable center distance between the tool and the workpiece, there occurs a second feed speed or step size, which is reduced compared with the first one, or wherein the plunge feed occurs initially at a first feed speed or rather step size and is then regulated down to at least a second feed speed or step size, which is reduced compared with the first one, through a measuring means for sensing forces and/or deflections and/or torques and/or noises and/or other vibrations, measured by said measuring means, which is very advantageous for the quality of the surfaces produced on the workpiece flanks.

In the case of the method which is being discussed here, the tool is always moved relative to the workpiece in one direction, which extends inclined with respect to the workpiece axis. Just like in gear shaving according to the diagonal method, machining could be done with a short feed path if the tool tooth system is correspondingly corrected, namely, is of a crowned design, in order to machine the tooth system of the workpiece over its entire width. Because of the inventive measure to permit the tool to carry out a tilting movement at the end of the precision working in order to produce a crowning on the tooth flanks, it is, however, possible to use a tool which does not have corrected tooth flanks.

Depending on the width of the tool and the angle, chosen for the feed direction with respect to the workpiece axis, already a relatively short feed path is sufficient in particular in the method mentioned above or in the feed movements without plunge feed also mentioned above to shift the point of contact or rather the common normal from one axial side of the workpiece tooth system over the tooth width to the other axial side. It is therefore advantageous to further develop the method wherein the relationship $$\tan \epsilon = \frac{1}{\tan \phi}$$

exists between the diagonal angle $\epsilon$ and the crossed-axes angle $\phi$ in order to obtain a feed path which is as optimal as possible.

BRIEF DESCRIPTION OF THE DRAWINGS

Several exemplar embodiments are illustrated in the drawings, in which.

DETAILED DESCRIPTION

Figures 1, 2:
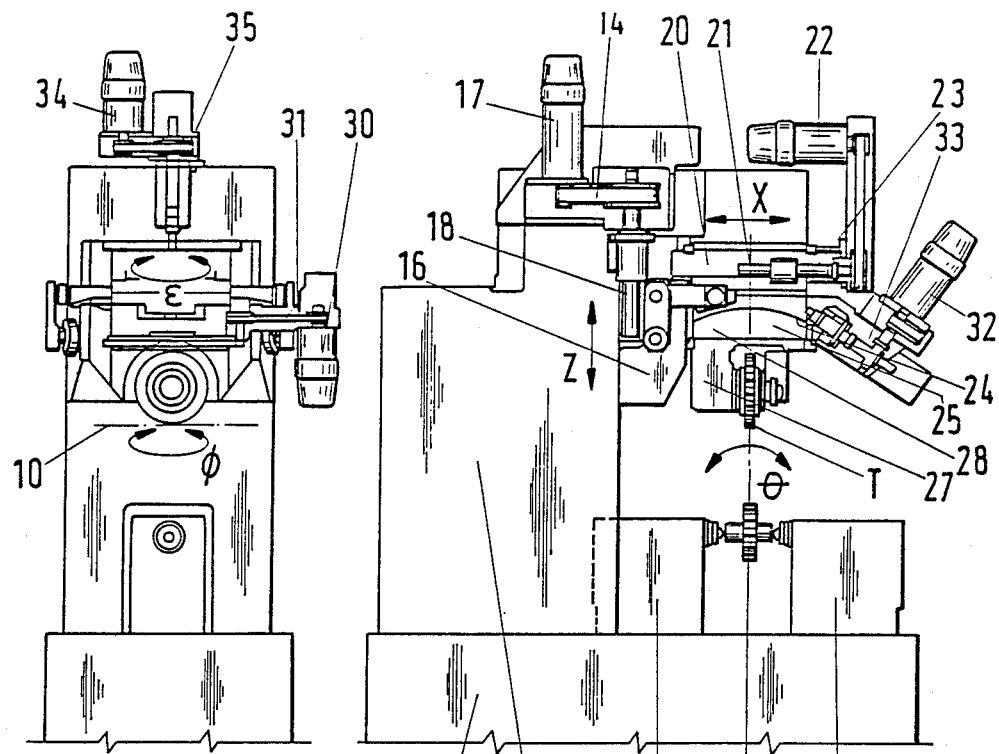
FIGS. 1 and 2 are a front and a side view, respectively, of a machine on which the inventive method can be carried out.

FIGS. 1 and 2 illustrate a so called hard-finishing or finish-grinding machine, on which hardened gears (workpieces) are precision worked. A workpiece W is received drivably for rotation on a bed 11 between tailstocks 12, 13. The motor (not illustrated), which is needed for the rotary drive is housed in a column 15, on which column a feed carriage 16 is mounted for vertical movement (arrow direction Z), driven by a motor 17 through a belt drive mechanism 14 and a pulley and spindle arrangement 18. A feed slide 20 is mounted adjustably with respect to rotation about a vertical axis 21 in a circular guide (not illustrated) in the feed carriage 16. The feed slide 20 can be moved back and forth horizontally (arrow direction X) relative to the feed carriage 16. A motor 22 and a spindle 23 are provided for this purpose.

A rockable slide member 25 is arranged in an arched guide 24 on the underside of the feed slide 20. A tool head 27 is adjustably mounted, with respect to rotation about a vertical axis 28, in a circular guide (not illustrated) on the rockable slide member 25. A hard-finishing gear (tool T), which will be discussed later on, is rotatably supported in the tool head 27. The axes 21 and 28 are in alignment and lie in the center plane of rotation 29 of the tool T.

By rotating the tool head 27 together with the rockable slide member 25 about the axis 28, for which purpose a motor 30 with a linkage arrangement 31 is provided, a crossed-axes angle $\phi$ is adjusted between the axis 3 of the tool T and the axis 4 of the workpiece W. The axes 3 and 4 lie in planes which are parallel to one another. By rotating the feed slide 20 about the axis 21, for which purpose a motor 34 with a gearing 35 is provided, a diagonal angle $\epsilon$, at which occurs the feed direction X of the tool T with respect to the workpiece axis 4, is adjusted. The tool T and the workpiece W are illustrated in FIGS. 1 and 2 for a better understanding as if the crossed-axes angle $\phi=0°$ and the diagonal angle $\epsilon=0°$; this would mean that without a crossing of the axes (which does not occur in practice), machining would take place in the parallel method.

The rockable slide member 25 with the tool head 27 and the tool T are pivotal about an axis 10 in the arched guide 24. The axis 10 is tangent at least approximately with the underside of the rolling cylinder of the tool T. A motor 32 with a worm drive 33 is provided for the pivotal movement.

Figure 3:
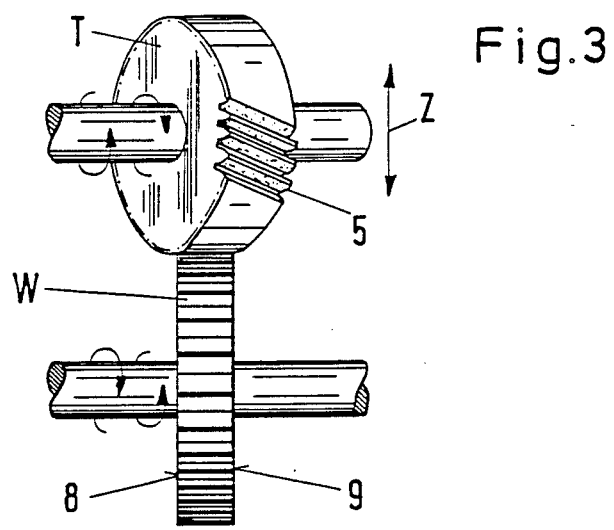
FIG. 3 is a side view of the tool of FIG. 1 in engagement with a workpiece.
Figure 4:
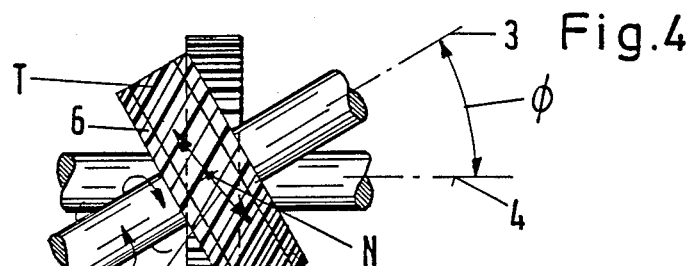
FIG. 4 is a top view of the tool and the workpiece shown in FIG. 3.

The tool T and the workpiece W mesh with one another for the precision working of the tooth flanks of the workpiece W, namely under crossed axes 3, 4 (FIGS. 3 and 4). The tool T has at least on the flanks 5 of its teeth an abrasive surface, namely, a surface which does not have any uniformly directed cutting edges. It consists as a rule of a toothed metallic base member, the tooth flanks 5 of which are coated with hard-material granules, for example of cubic boron nitride (CBN) or diamond. (If gears, which are not yet hardened, are to be machined, the tool T can also consist entirely of ceramic or synthetic resin with cutting granules embedded therein.) The teeth of the tool T are not corrected in the longitudinal direction of the teeth. Such teeth can be manufactured easier with the required accuracy in particular in the case of coated tools than corrected teeth, because a correction can be worked into the teeth coated with CBN or even with diamond only with an extremely high amount of work, time and expense.

The tool T or—as in the above described machine—the workpiece W is driven for rotation for the machining operation, the respective other member correlates due to the meshed tooth systems thereof. The tool T is moved back and forth in arrow direction X relative to the workpiece during the rotation. The feed movement occurs in a plane which lies parallel to the axes 3, 4. Aside of the feed movement X there occurs intermittently or continuously thereto a radial infeed or plunge feed in arrow direction Z. It is also possible to change the direction of rotation once or several times during this movement. These movements will be discussed later on.

A point contact exists theoretically at the point of contact N between the tool T and the workpiece W, which point lies on the so called common normal, an imaginary connecting line between the axes 3, 4 and directed perpendicularly thereto. The point of contact changes its position between the axially facing faces 8, 9 of the workpiece W during the feed movement X, namely it moves from the one extreme position M at the one face 8 through the illustrated center position N to the other extreme position 0 at the other face 9. In order that this is possible with a feed path which is as short as possible, very specific relationships must be considered.

It has been found that between the diagonal angle $\epsilon$, that is, the angle between the axis 4 and the feed direction X, and the crossed-axes angle $\phi$ between the axes 3 and 4, the relationship $$\tan \epsilon = \frac{1}{\tan \phi}$$

is to exist.

Figure 5:
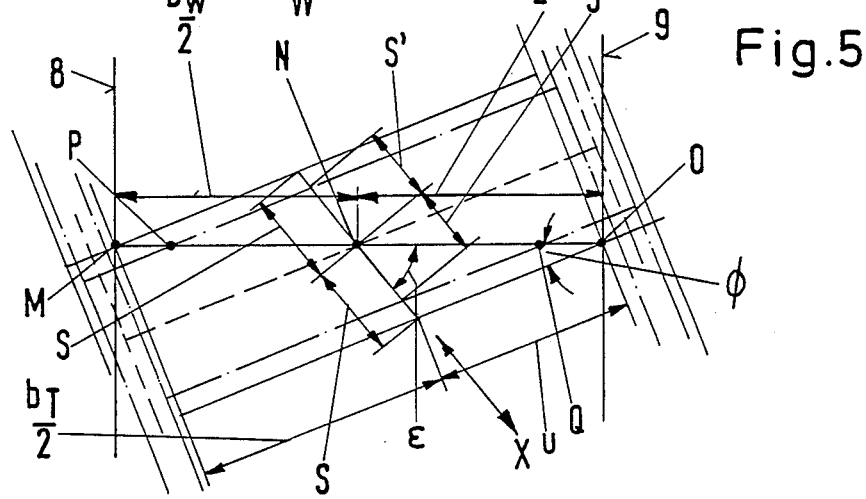
FIG. 5 is a much simplified enlarged schematic illustration of the structural relationships of FIG. 4 with varying positions of the tool.

These parameters are illustrated in FIG. 5 for a better understanding. Furthermore, the distance along the feed path, which is to be covered in order to move the point of contact from the illustrated center position into the extreme position 0, is identified by the letter s and the right portion u of one half of the width of the tool T, which right portion still coincides with the projection of the workpiece, with the letter u. $b_T$ and $b_W$ identify the widths of the tool T and workpiece W.

Figure 6:
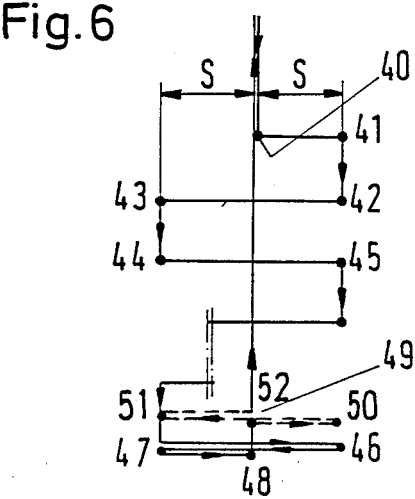
FIGS. 6, 7 and 8 schematically illustrate three examples of an operating sequence of the method according to the invention.

The tool T, in the operating sequence of the method illustrated in FIG. 6, meshes first with the workpiece W, namely through an initially fast, then considerably slower radial feed in the sense of a center-distance reduction until a starting point 40 for the machining task has been reached, at which point a two-flank abutment between the tool T and workpiece W exists. The workpiece starts to rotate already slightly earlier when play still exists between the teeth of the tool T and the teeth of the workpiece W. The tool teeth engaging the teeth of the workpiece start the workpiece W to rotate. During a subsequent feed movement to a point 41, the point of contact is moved from the center position N into an extreme position 0 at the face 9. An infeed or radial plunge feed movement to a point 42 occurs before an oppositely directed feed movement to a point 43 occurs, at which the point of contact reaches its other extreme position M at the oppositely lying face 8 of the workpiece. A further infeed or radial plunge feed to a point 44 occurs and again a feed movement to a point 45. These steps can be repeated several times. The last speed movement from a point 46 to a point 47 and back to a point 48, at which the point of contact lies again in the center position N, occurs without an infeed or radial plunge feed movement which is before or inbetween these movements. Before the tool T and the workpiece W are again moved apart, a further back and forth movement (points 49, 50, 51, 52) can be inserted, after the tool T has been pulled back for a very small distance from point 48 to a point 49. This back and forth movement serves to smoothen the tooth flanks without material being noticeably removed therefrom.

Figure 7:
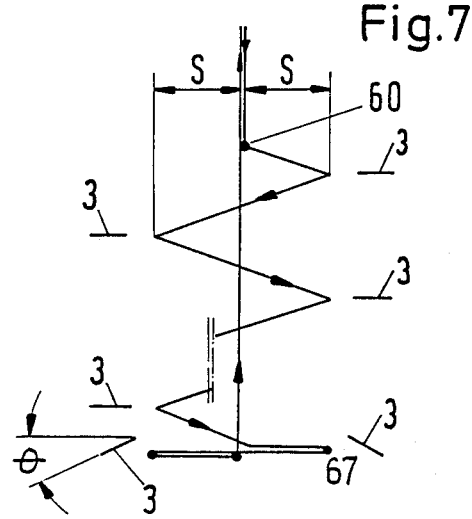

In the operating sequence of the method illustrated in FIG. 7, the feed and infeed or radial plunge feed movements occur simultaneously starting out from an initial point 60, that is, the feed movements superpose the infeed movements. After several back and forth movements the point 67 is reached. The method can now continue as in the example according to FIG. 6 starting with the point 46. If, however, a longitudinal crowning on the workpiece teeth is to be produced, the tool T is then tilted at an angle $\Theta$ about the axis 10 during the last back and forth movements. This tilting movement is illustrated in FIG. 7 at the turning points by short dashes, which symbolize the tool axis 3. The tool teeth penetrate with this tilting movement toward the axially facing sides 8, 9 deeper into the workpiece and remove more material from this portion of the teeth of the workpiece, which creates a crowned tooth system.

The direction of rotation can be changed one or more times between the points 40 and 52 or can be changed after the point 60. Necessary is the change in the direction of rotation in the two-flank abutment, however, not in every case; rather one will very often arrive at a satisfactory machining result without a change in the direction of rotation, which does require time.

With the method described in connection with FIG. 7, it is also possible to create conical and conically crowned tooth flanks on the workpiece. The infeed or radial plunge feed in the one direction of the feed movement must in both cases always be made larger than in the other direction. The tilting movement is then at the end in addition suitably superposed for conically crowned teeth.

Figure 8:
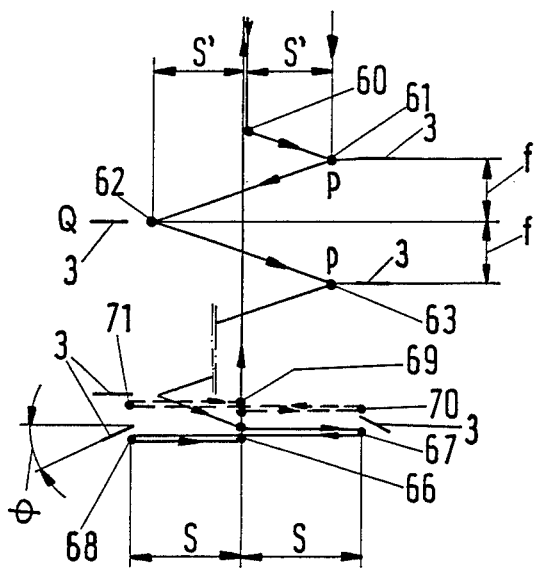

In the operating sequence of the method illustrated in FIG. 8, the tool T first meshes with the workpiece W, namely through an initially quick, then considerably slower radial feed in the sense of a center-distance reduction until an initial point 60 for the machining has been reached, at which a two-flank abutment exists between the tool T and the workpiece W. The workpiece starts to rotate already slightly earlier when play between the teeth of the tool T and the workpiece W still exists. The tool teeth start the rotation of the workpiece W. During a subsequent feed movement to a point 61, the point of contact is moved from the center position N toward the face 9 to a reversal point P. Simultaneous with the feed movement occurs an infeed or radial plunge feed movement, namely the infeed movement is—also during the following feed movements—superposed over the feed movement. From the reversal point P starts an oppositely directed feed movement to a point 62, at which the point of contact reaches a reversal point Q. From here occurs again an oppositely directed feed movement to a point 63, at which the point of contact again reaches the reversal point P. These changing feed movements with superposed infeed or radial plunge feed movements are repeated until at a point 66 the desired center distance between the workpiece axis 4 and the tool axis 3 is reached. The crossed-axes point has up to now always only covered the distance 2·S', not, however, the distance 2·S which would be necessary in order to machine the tooth flanks over the entire width of the tooth. This means that the workpiece teeth were machined only in a center section while only an incomplete chip removal with the not fully engaged side areas 6, 7 of the tool tooth flanks 5 occurred on the following sections facing the tooth faces. As can be recognized from FIG. 9, where the chip removal is schematically illustrated during several feed movements, the workpiece W has very slight hollow-crowned tooth flanks, because so far hardly any chip removal has taken place at the ends of the tooth.

Figure 9:
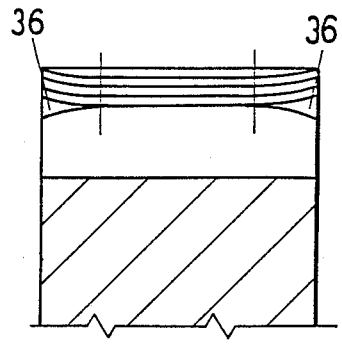
FIG. 9 illustrates several phases of the chip removal on a workpiece tooth during the operating sequence of the method according to FIG. 8.

After reaching the desired center distance, at least one more back and forth feed movement is carried out. These last feed movements from point 66 to a point 67, back to point 68 and again back to point 66, at which the point of contact lies again in the neutral position N, takes place without an infeed or radial plunge feed movement. Prior to the tool T and the workpiece W being now again moved apart, a further back and forth movement (points 69, 70, 71, 69) is inserted, after the tool T has been pulled back a very small amount from point 66 to a point 69. This back and forth movement serves to smoothen the tooth flanks without material being noticeably removed. Of a particular importance is that the points 67, 68 lie on the axial side edges of the workpiece teeth, the crossed-axes point thus always cover the distance 2·S, and the tool T during the last back and forth movements is tilted about the axis 10 at an angle Θ. FIG. 8 illustrates this tilting movement in each case at the reversal points by short dashes, which symbolizes the tool axis 3. The tool teeth penetrate with the tilting movement toward the axially facing faces 8, 9 deeper into the workpiece and remove more material there, which creates a crowned tooth system. FIG. 9 shows that this material removal occurs in the wedge-like edge areas identified by the reference numeral 36, into which areas the tool penetrates at an acute angle, so that a slowly increasing penetration depth results. The tool is protected in this manner and is less worn than in common methods.

The direction of rotation can here too be changed one or several times between the points 60 and 72, however, the change in the direction of rotation in the two-flank abutment is not necessary in every case; rather one will very often obtain a satisfactory machining result without a change in the direction of rotation, which does require time.

Figure 10:
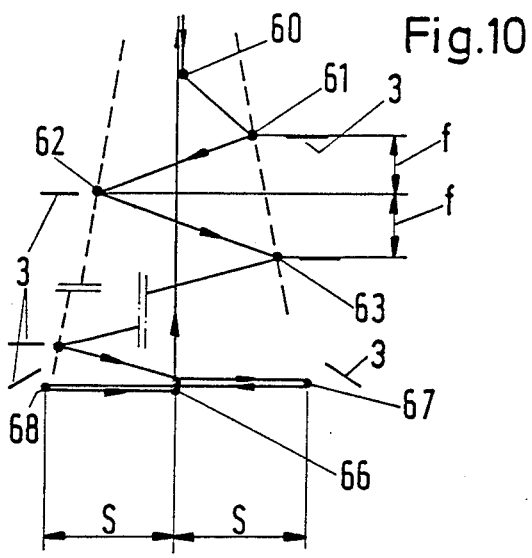
FIG. 10 schematically illustrates another example for an operating sequence of the method according to the invention.
Figure 11:
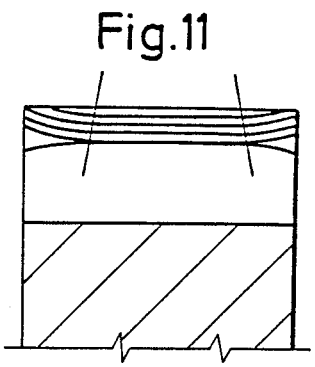
FIG. 11 illustrates several phases of the chip removal on a workpiece tooth during the operating sequence of the method according FIG. 10.

Instead of providing, as above described, fed movements always having the same length, these can also with progressive plunge feed be increased at least once, as this is shown in FIG. 10. It is understood that the center section, in which the workpiece teeth are machined, becomes longer with each enlargement of the feed (FIG. 11).

Figure 12:
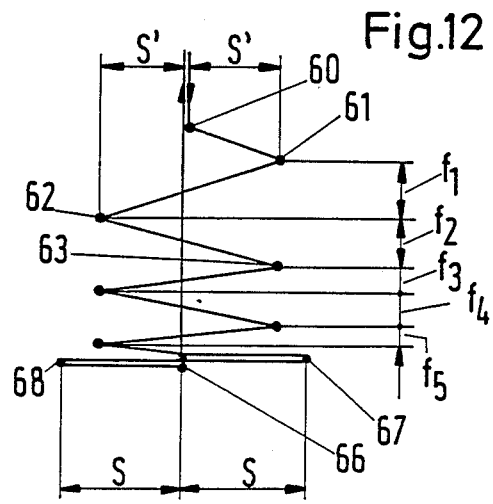
FIGS. 12 and 13 schematically illustrate two further examples of operating sequences of the method according to the invention.

To improve the surface of the workpiece tooth flanks, the plunge feed, which are superposed over the feed movements, can also be changed such that initially larger plunge feed movements occur followed by plunge feed movements which are smaller in size. In FIG. 12, each successive plunge feed stroke $f_1$, $f_2$, ... is smaller than the preceding one, in contrast to FIG. 8, where all plunge feed strokes f have the same size.

Figure 13:
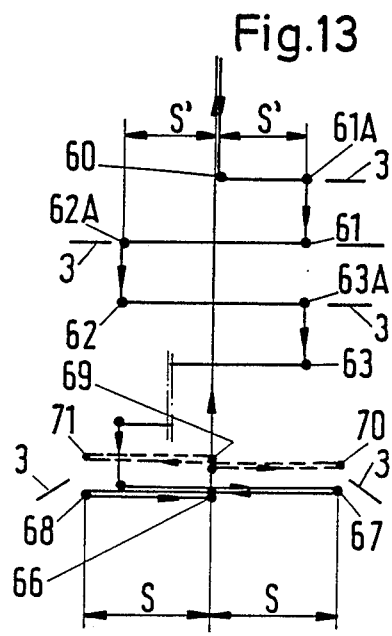

The plunge feed movements do not need to be superposed over the feed movements. They can also occur independently therefrom, for example at the reversal points, as this is illustrated in FIG. 13. The parameters which are used in FIG. 8 are the basis thereby. The reversal points have the same numbers and at the respective end points of the feed movements these numbers have the suffix "A" added thereto. Also the discontinuous plunge feed movements can be larger initially and can then become smaller, as this has been described in connection with FIG. 12 for the continuous plunge feed movements, and the feed movements can be enlarged in the same manner as this has been described in connection with FIGS. 10 and 11.

Figure 14:
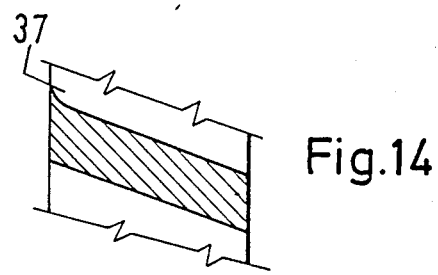
FIG. 14 is a cross-sectional view of a tooth of a helically toothed workpiece.

Because of the danger of a secondary burr formation 37 at the pointed tooth ends (FIG. 14), which danger exists in helically toothed gears, the initial mesh between the tool T and the workpiece W is advantageously placed such that the initial point 60 coincides with the above mentioned point 61 at the area of the tooth flank which is adjacent to the blunt tooth end. This is indicated by a dashed line in FIG. 8.

Figure 15:
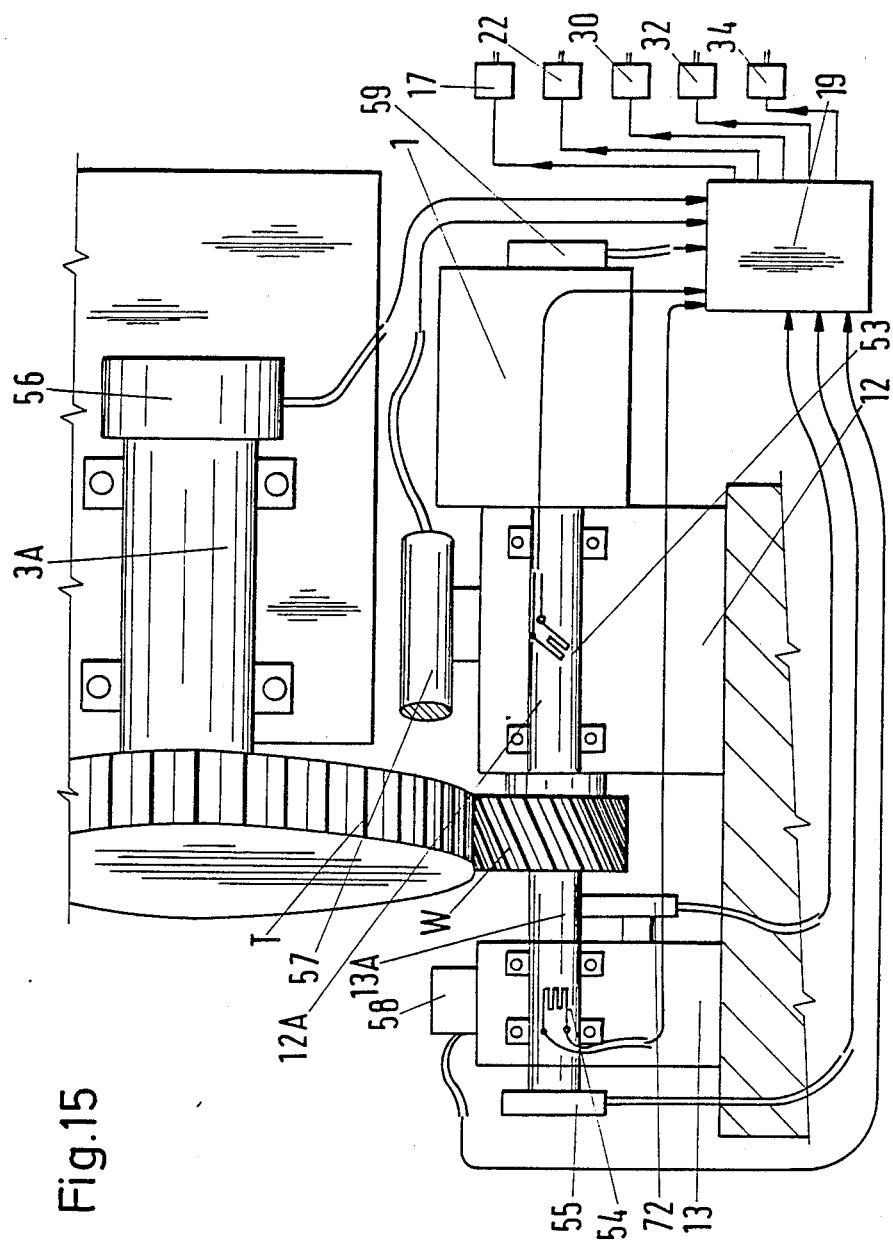
FIG. 15 illustrates the arrangement of sensing devices on the machine according to FIG. 1.

The transition from initially larger to smaller plunge feed movements does not need to take place according to a more or less rigid plan, which can be influenced by the operator of the machine, but can also be controlled by a sensitive device in dependency of forces measured in the machine system, such as spindle deflections, torques, noises and/or other vibrations. Resistance strain gauges (DMS) 53, 54 mounted at suitable areas can for example but used as sensor (FIG. 15): DMS 53 arranged on the drive spindle 12 can measure torques and DMS 54 or shift receiving means arranged on the tailstock spindle 13A can measure spindle deflection forces. Vibrations can be detected directly through tangential acceleration receiving means 55, 56 at the tailstock spindle 13A and/or at the tool spindle 3A or indirectly through radiated noises detected by a microphone 57 near the tool-workpiece pair or detected by impact-noise receiving means 58 on a machine part, for example on the tailstock 13. The values detected by the sensor or, if desired, the sensors are fed to a machine control 19, just like the values detected by a rotation transmitter 59 on the drive motor 1, are there compared with corresponding predetermined values and are converted into signals which are forwarded to the various motors 17, 22, 30, 32, 34.

The embodiments of the invention in which an exclusive property or privilege is claimed are defined as follows:

1. In a method for the precision working of crowned tooth flanks on toothed workpieces while the toothed workpiece is undergoing a two-flank abutment with a toothed tool having abrasive surface means on its tooth flanks, namely, a surface which does not have any uniformly directed cutting edges and is in the form of a coating of hard material granules, axes of the tool and the workpiece being crossed at a crossed-axes angle ($\phi$), the tool carrying out at least one back and forth feed movement and at least one of a continuously occurring plunge feed and a discontinuously occurring plunge feed movement in the sense of a center-distance reduction relative to the workpiece, the feed movement occurring perpendicularly with respect to a common normal to the tool and workpiece axes and at a diagonal angle ($\epsilon$) inclined with respect to the workpiece axis, and following the final plunge feed whereat the desired center distance is reached, at least one further feed movement (X) being carried out without plunge feed, the improvement wherein the tool, during at least one feed movement (X) without plunge feed and only following the final plunge feed, carries out a tilting movement about an axis which is at least approximately tangent to the rolling cylinder of the tool (T) and is directed both perpendicularly with respect to the common normal (N) and also perpendicularly with respect to the workpiece axis.

2. The method according to claim 1, wherein:
(a) the feed movements, which occur in connection with the plunge feed, are dimensioned such that the path covered by the crossed-axes point on the workpiece in axial direction, ends before the crossed-axes point has reached the edges of the tooth flanks at the axially facing sides of the tooth,
(b) the feed movements, which occur without plunge feed, are dimensioned such that the path covered by the crossed-axes point on the workpiece in axial direction, ends the earliest when the crossed-axes point has reached the tooth flanks, and
(c) the tool carries out only during at least one feed movement (X) without plunge feed and after the final plunge feed, a tilting movement about an axis which at least is tangent to the rolling cylinder of the tool and is directed both perpendicularly with respect to the common normal (N) and also perpendicularly with respect to the workpiece axis.

3. The method according to claim 2, wherein all feed movements occurring with the plunge feed are equally long.

4. The method according to claim 2, wherein:
(a) the feed movements, which occur in connection with the plunge feed, are dimensioned such that the path covered by the crossed-axes point on the workpiece in axial direction ends at least initially prior to the crossed-axes point reaching the axial edges of the tooth flanks and is enlarged at least once with a progressing plunge feed;
(b) the feed movements, which occur without plunge feed, are dimensioned such that the path covered by the crossed-axes point on the workpiece in axial direction, ends the earliest when the crossed-axes point has reached the tooth flanks, and
(c) the tool carried out only during at least one feed movement (X) without plunge feed and after the final plunge feed, a tilting movement about an axis which at least is tangent to the rolling cylinder of the tool and is directed both perpendicularly with respect to the common normal (N) and also perpendicularly with respect to the workpiece axis.

5. The method according to claim 1, wherein the feed movements occurring with the plunge feed are continuously enlarged.

6. The method according to claim 1, wherein the feed movements, in relationship to the tooth flanks, start off-center.

7. The method according to claim 1, wherein the plunge feed occurs initially at at least one of a first feed speed and a step size and after reaching a selectable center distance between the tool and the workpiece there occurs at least one of a second feed speed and a step size, which is reduced compared with the first one.

8. The method according to claim 1, wherein the plunge feed occurs initially at at least one of a first feed speed and a step size and is then regulated down to at least one of a second feed speed and step size, which is reduced compared with the first one, through a measuring means for sensing at least one of (1) forces, (2) deflections, (3) torques, (4) noises, and (5) other vibrations, measured by said measuring means.

9. The method according to claim 1, including the use of a tool with teeth which are not corrected in a longitudinal direction of the tooth.

10. The method according to claim 1, wherein the relationship $$\tan \epsilon = \frac{1}{\tan \phi}$$

exists between the diagonal angle ($\epsilon$) and the crossed-axes angle ($\phi$).

11. The method according to claim 1, wherein the abrasive surface means includes at least one of CBN granules and diamond granules.

* * * * *